United States Patent
Sutherland et al.

(10) Patent No.: US 6,580,964 B2
(45) Date of Patent: Jun. 17, 2003

(54) CALIBRATIONS OF AN ANALOGUE PROBE AND ERROR MAPPING

(75) Inventors: Alexander T Sutherland, Edinburgh (GB); David A Wright, Edinburgh (GB)

(73) Assignee: Renishaw plc, Gloucestershire (GB)

( * ) Notice: Subject to any disclaimer, the term of this patent is extended or adjusted under 35 U.S.C. 154(b) by 0 days.

(21) Appl. No.: 10/232,396

(22) Filed: Sep. 3, 2002

(65) Prior Publication Data

US 2003/0009257 A1 Jan. 9, 2003

Related U.S. Application Data

(63) Continuation of application No. 09/555,957, filed as application No. PCT/GB99/03531 on Oct. 25, 1999.

(30) Foreign Application Priority Data

Oct. 24, 1998  (GB) .............................................. 9823228

(51) Int. Cl.⁷ .............................................. G06F 19/00
(52) U.S. Cl. ......................................... 700/193; 702/94
(58) Field of Search ................................ 700/169, 173, 700/175, 174, 178, 193, 194, 195; 702/85, 92, 94, 95, 97

(56) References Cited

U.S. PATENT DOCUMENTS

| | | | |
|---|---|---|---|
| 4,638,232 A | 1/1987 | Stridsberg et al. | 700/195 |
| 4,819,195 A | 4/1989 | Bell et al. | 702/95 |
| 4,875,177 A | 10/1989 | Jarman | 700/193 |
| 4,945,501 A | 7/1990 | Bell et al. | 702/95 |
| 4,974,165 A | 11/1990 | Locke et al. | 700/193 |
| 5,007,006 A | 4/1991 | Taylor et al. | 702/97 |
| 5,412,880 A * | 5/1995 | Raab | 33/503 |
| 5,687,293 A * | 11/1997 | Snell | 700/254 |
| 5,796,619 A * | 8/1998 | Wampler | 700/195 |
| 5,949,685 A | 9/1999 | Greenwood et al. | 700/193 |

FOREIGN PATENT DOCUMENTS

| | | |
|---|---|---|
| DE | 44 39 578 C1 | 2/1996 |
| EP | 0 389 108 A2 | 9/1990 |
| EP | 0 599 513 A1 | 6/1994 |
| GB | 1 551 218 | 8/1979 |

* cited by examiner

*Primary Examiner*—Leo Picard
*Assistant Examiner*—Kidest Bahia
(74) *Attorney, Agent, or Firm*—Oliff & Berridge, PLC

(57) ABSTRACT

An analogue probe having a stylus with a spherical tip of radius (r) is calibrated using a sphere of known radius (R) mounted on a machine. The stylus tip is driven into the sphere from a plurality of directions (at least 9), each nominally normal to the sphere surface, until the stylus has deflected a predetermined amount. The machine movement is then reversed, and probe (a,b,c) deflection outputs are recorded simultaneously with machine (X,Y,Z) axis positions until the stylus tip leaves the surface. The readings are extrapolated to obtain the (X,Y,Z) readings when the probe radial deflection is zero. The value of (R+r) is determined from these readings along with the position of the sphere center giving a value with zero probe errors. Values of (R+r) are also determined using a pre-selected radial deflection for each of the directions, by converting probe (a,b,c) outputs at that deflection to incremental machine (X,Y,Z) axis values using a trial probe transformation matrix. The differences in (R+r) values from the value obtained by extrapolation are noted as an error in each case, and the trial probe matrix is then optimized until the errors are minimized using the transformation obtained by the calibration, the probe can be error mapped.

15 Claims, 1 Drawing Sheet

CALIBRATIONS OF AN ANALOGUE PROBE AND ERROR MAPPING

Figure 1:
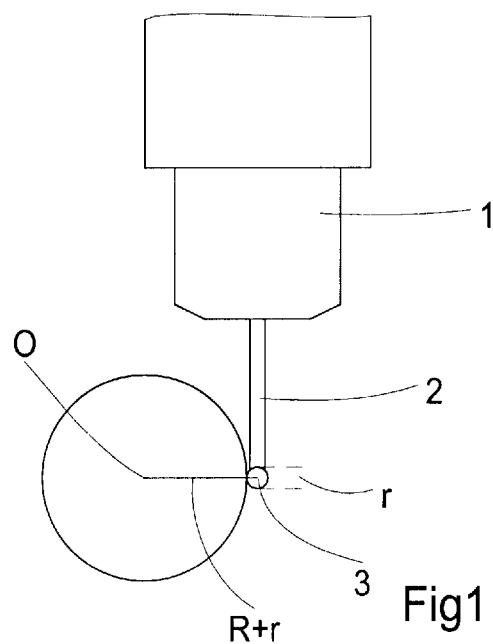

This is a Continuation of application Ser. No. 09/555,957 filed Jun. 7, 2000, which in turn is a U.S. National Stage of PCT/GB99/03531, filed Oct. 25, 1999. The entire disclosure of the prior application(s) is hereby incorporated by reference herein in its entirety.

The present invention relates to a method of calibrating analogue probes. The method has particular reference to the calibration of analogue probes which have a stylus for contacting a workpiece, and which is mounted on a mechanical suspension, for example a spring suspension.

Analogue probes of this type are well known and an example of such a probe is described in our UK Patent No. 1,551,218. This patent describes a probe suspension mechanism which comprises three orthogonally arranged pairs of parallel springs connected in series between a fixed point on the probe housing and a movable member to which a workpiece contacting stylus is connected.

During a measuring operation on a workpiece using such a probe, a machine on which the probe is mounted is driven towards the workpiece to bring the stylus into contact with the workpiece surface at various points on the surface. When the stylus contacts the workpiece the stylus will be deflected as the machine continues to move, and measuring transducers within the probe generate outputs representing deflections of the probe stylus along three orthogonal axes. These axes are referred to as the a,b and c axes of the probe.

Ideally it would be arranged that the a,b, and c axes of the probe are aligned with the X,Y and Z coordinate axes of the machine when the probe is mounted on the machine, so that the measured deflections of the probe stylus will take place along the X,Y and Z axes of the machine. However, such alignment is not always possible to achieve.

Also, if there is any mis-alignment between the three probe a, b and c axes, such that they are not orthogonal, then deflection of the stylus, for example, nominally in the a direction can give rise to deflections in the b and c directions also.

Additionally, the scaling factors of the three probe axes, will, in general, deviate from their nominal values.

Therefore, it is usual to calibrate the probe and machine system to determine the effects of any such mis-alignments and scaling errors, and thereafter to correct any measurements made on a workpiece for these effects.

One method of performing the calibration is to mount a calibration artefact (usually a reference sphere of known diameter) on the machine, and to drive the probe towards the artefact, for example, along one of the machine axes, until an increase in the output of the measuring devices of the probe above a pre-determined threshold level indicates that contact with the surface of the artefact has been made. After stylus contact has been confirmed, a set of machine X,Y,Z and probe a,b,c coordinate data are taken. Machine movement continues until the machine has moved a selected distance beyond the confirmed contact point, and a further set of X,Y,Z, and a,b,c coordinate data are taken.

The changes in the a,b,c outputs of the probe's measuring transducers in the three axes are recorded and correlated with the changes in the readings of the machine's measurement devices along each of the three machine axes. This procedure is repeated for two other orthogonal directions, which may be the other two machine axes, and from the sets of readings a probe transformation matrix can be established which relates the probe outputs in the a,b and c axes to the machine's X,Y and Z coordinate system. This involves solving the nine simultaneous equations relating the a,b, and c axis data to each of the X,Y, and Z axes. This process may be repeated for one or more further deflections but normally only relatively few data points are taken.

Once the transformation matrix has been established the relevant machine axis components of the probe deflections can be obtained by multiplying the relevant probe output by the relevant matrix term.

The key assumption in this calibration is that the machine movement mirrors the probe tip movement. However, this assumption becomes invalid when the stylus slips on the surface of the sphere.

There are two factors which can cause the stylus to slip on the sphere surface;

I) the machine may not go down the commanded direction accurately enough to prevent slippage, ii) the probe force and deflection vectors may not coincide closely enough to prevent slippage.

In accordance with a first novel aspect of the present invention there is provided a method of calibrating an analogue probe which is relatively immune to errors caused by slippage of a stylus on the surface of the calibration artefact. The method therefore allows a more accurate probe transformation matrix to be produced.

In accordance with a second novel aspect of the invention, the above procedure may be carried out in multiple directions (i.e. more than the minimum of three) which facilitates the calculation of a matrix which is more accurate at directions away from the machine axis.

In accordance with another novel aspect of the present invention there is provided a method of error mapping the deflections of an analogue scanning probe.

Figure 2:
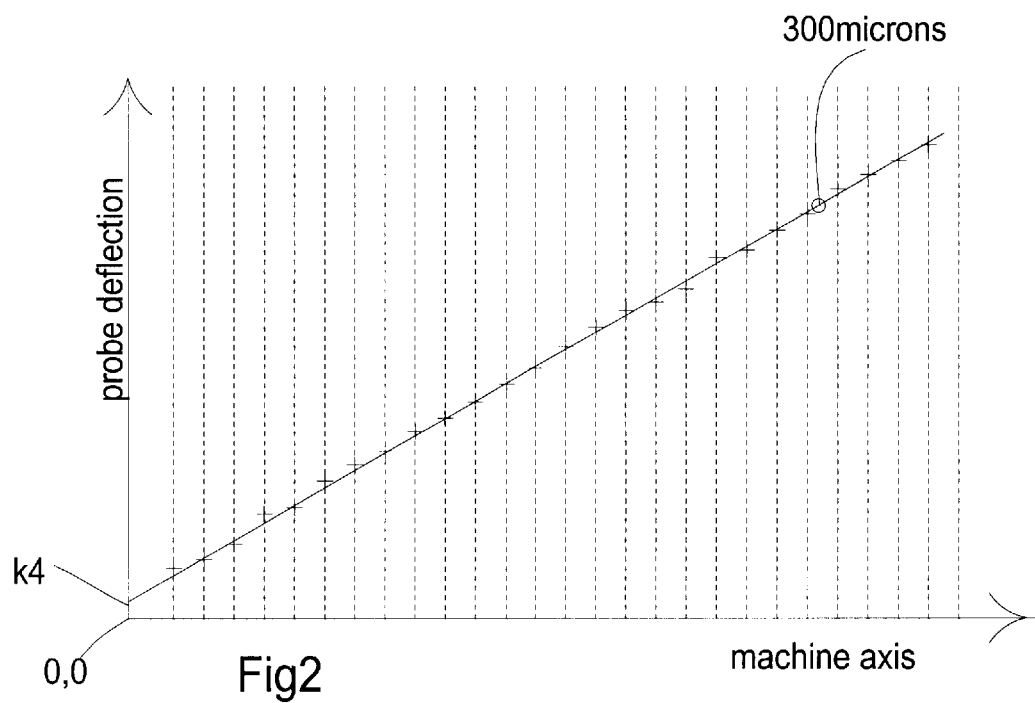

The methods of the invention will now be more particularly described with reference to the accompanying drawings in which:

FIG. 1 illustrates a scanning probe with its stylus in contact with a reference artefact, FIG. 2 shows a plot of probe deflections versus machine movement in one of the X Y Z axes of the machine, Referring now to FIGS. 1 and 2, there is shown an analogue probe 1 mounted on a machine quill (not shown) and which has a stylus 2 with a stylus ball 3 at its free end. The stylus is shown in contact with a reference sphere of known radius R and having its centre O at position X1,Y1, Z1 in the machine axis coordinates. The stylus ball has a radius r which is to be determined, along with the position of the centre of the sphere and the probe transformation matrix.

As a first step in the calibration method the probe must be "zeroed" in its free condition. This simply involves taking readings from the probe measurement transducers when no contact force is acting on the stylus and setting these to zero in all three axes, or alternatively storing these readings so that they can be subtracted from all subsequent readings.

The next step is to make an estimate of the position of the centre of the sphere, by taking measurements of points at four positions around the surface of the sphere from which the position of the centre can be calculated in known manner, and using a relevant default probe transformation matrix as a starting point. This step is needed because the calibration method requires the sphere to be contacted at least at 9 points, but up to as many as may be required with a reasonable distribution over its surface, taking account of obstructions, and it is important that the machine should be driven so the probe will contact the surface at approximately the right positions on the surface of the sphere. However, it is not important that the position of the centre of the sphere is known accurately at this stage.

The calibration method requires that for each of the plurality of points of the calibration algorithm, the probe stylus is driven by the machine into contact with the sphere in a direction which is nominally normal to the sphere surface. After the stylus ball has contacted the surface of the sphere, the machine continues to drive the probe in the same direction until the deflection of the stylus exceeds the required calibration deflection. The magnitude of this deflection is determined by the deflections which will occur in practice when the probe is being used to measure a workpiece.

Once the required deflection of the stylus has been achieved the machine is stopped and reversed along its approach path, and readings are taken simultaneously at regular intervals, of the outputs of the measuring devices of the machine and the measuring transducers in the probe, to provide the a, b and c outputs of the probe synchronized with the X, Y and Z coordinates of the machine position. This process continues until the probe stylus leaves the surface and for a small distance thereafter to take account of noise and time lags in the probe outputs.

This data may now be used to calculate the X,Y, and Z axis positions of the machine at zero probe deflection for each of the points on the sphere, for example, by fitting the data for each point to an equation of the form;

$$x = k_1.a + k_2.b + k_3.c + k_4$$

and then extrapolating to zero, i.e. $x = k_4$.

Because the reference sphere and the stylus ball are both specified as being accurately spherical, it follows that all of these extrapolated points must be on the surface of a sphere of radius R+r. From the points which have been calculated, the radius R+r and the position of the centre of the sphere can now be calculated more accurately using a standard multi-point sphere fit function, for example the least squares best fit method. Since the radius R of the sphere is known the radius r of the stylus ball can now be determined.

As an alternative to using an "extrapolation to zero" process with its attendant uncertainties, the data obtained as the machine is reversed may be interpolated between two points at a very small stylus deflection.

It is to be noted that this part of the calibration process does not require the use of a probe transformation matrix since the probe deflection is zero or very small. Therefore probe errors in the calculation are eliminated or rendered insignificant.

A magnitude of probe deflection is now selected, for example, 300 microns, which is representative of the deflections which will be used in subsequent measurements, and from each of the sets of data, a small number of probe and machine readings on either side of the nominal 300 micron deflection position are averaged and interpolated to provide estimated X,Y and Z machine axis coordinates and a,b,c probe outputs at the 300 micron probe deflection point.

A trial probe matrix, for example, the previously used default matrix is applied to these estimated probe outputs at the 300 micron radial deflection. Using this trial probe matrix, the a,b,c probe output values are transformed to X,Y,Z machine components, which may then be added to the X,Y,Z machine distances for the sphere centre. The radius of the sphere R+r is calculated for each of the (at least nine) positions at which calibration data was taken and the radius errors are stored. An optimisation calculation is then carried out for each of the coefficients in the probe matrix, by adjusting them until, for example, the root sum of the squares of the radial errors at the positions is minimised. Software for carrying out this optimisation process is known and available from various mathematical function libraries, and detail is not therefore explained here.

The optimisation process may include three additional coefficients representing the position of the centre of the sphere, in which case at least twelve positions at which calibration data was taken must be used.

The above-described calibration process provides a probe matrix optimised for one radial deflection of the stylus, and, if desired, further calculations can be carried out for other deflections of the probe within the normal measuring range. A basic requirement of the calibration process is the validity of the assumption that the stylus ball remains on the surface of the reference sphere while the data is being gathered at each of the points. It is also important that the acquisition of the measurement data from the measuring devices of the machine giving the X,Y and Z coordinates at each point is adequately synchronised with the data coming from the probe measuring devices which provide the probe axis a,b and c data.

Once the probe has been calibrated and the probe matrices determined, it is then possible to error map the probe using the data already collected using an extension to the above process.

The novel part of the error mapping technique is based on the realisation that as long as the stylus ball remains in contact with the surface of the reference sphere, while data is being collected, it is sufficient to map radial errors only because tangential errors are insignificant for parts with constant or slowly varying radius of curvature. This significantly reduces the number of measurements compared with that which would be required to produce a conventional full error map of the probe's deflections. A further advantage is that the only apparatus needed to perform this procedure is an accurate sphere, and these are commonly available.

In order to produce the error map the previously stored data can be used. The probe outputs in the a,b and c axes are transformed into machine X,Y and Z coordinate positions using the probe matrix generated by the calibration method. The radius from the centre of the sphere to the centre of the stylus tip is calculated. The radius error from the previously calibrated sum of the known sphere and tip radii, is stored against the probe deflection magnitude and the azimuth and elevation angles of the contact point at the 300 micron deflection. Typically the probe deflection magnitude but not direction is then changed and a second radial error calculated and stored against the second deflection magnitude at the same azimuth and elevation angles.

The two probe deflections selected are representative of the highest and lowest probe deflections likely to be encountered during a subsequent measuring operation. However, further data at other probe deflections may be gathered to improve the certainty of data interpolated from the subsequent error map.

The above process is repeated for further relevant directions and a map is compiled of radial errors against azimuth and elevation angles for two deflection magnitudes. Typically this process generates a map in the form of a part spherical shell of probe deflections. The inner and outer radii of the shell would normally bracket all anticipated measuring probe deflection magnitudes and the azimuth and elevation angle ranges will be selected relative to the anticipated practical probe deflection directions. For example, if vertical axis bores only are to be scanned, an elevation angle of 0° would be sufficient.

Various methods may be used for acquiring the data required for the error map. These methods include a series of nominally radial movements of the probe stylus towards the sphere centre at desired positions around the sphere, by scanning around the sphere at several different constant deflections, or with continuously varying deflections, by scanning in one or more planes which may be parallel, orthogonal or angled, or by any combination of these techniques. The map itself may consist of a multi-dimensional look-up table of radial errors versus deflection magnitude, azimuth and elevation angles, or it may consist of a function with associated polynomial coefficients, or a trigonometrical function.

If the map is in the form of a look-up table then subsequent measurement errors are corrected by interpolating the stored radial error values to acquire the correction to be applied to the stylus tip position at the measured position. Alternatively if the map is a polynomial function the radial error expression is solved for the deflection magnitude and angles at the measured position.

It has been found that friction between the stylus tip and the surface of the sphere can cause additional errors which need to be taken account of in the error map. In practice we have found that friction causes the probe deflection vector to be at some angle from the outward normal from the surface of the sphere. This may be any positive or negative angle up to the maximum angle of friction, depending on the direction of movement of the probe tip relative to the sphere. We have found that the measuring errors increase as the friction coefficient increases, and with the amount of asymmetry in the errors of the probe a,b and c axes. For example, at a radial deflection of 1 mm with a friction angle of 8.5° and an asymmetry in the a and b axes of 3% a normal error of 2.5 microns can be present.

The coefficient of friction of the probe tip varies according to the material and condition of the contacted workpiece surface, and will almost certainly differ from that of the calibration/mapping artifact.

Since it is difficult to predict or control the coefficient of friction, in a further novel refinement to the error mapping process, we have found that the current angle of friction can be determined to a first order by comparing the probe deflection vector direction with the measured surface normal direction (this being derived from the actual probe tip locus). Although this value of friction angle is inaccurate because it is derived from the probe outputs the errors of which are being mapped, it is accurate enough to enable a first order improvement in the accuracy of the error map.

In an additional step therefore in the method of creating the error map it is proposed that the reference sphere should be scanned both clockwise and anti-clockwise and the apparent angle of friction determined from the difference in the probe deflection vector and the surface normal direction. Then, in addition to the stored correction value, which is preferably calculated for zero coefficient of friction, the value of the rate of change of correction with friction angle is also stored for each azimuth elevation and radial deflection. Subsequent measurements can then be corrected by an amount found by interpolating the stored correction value and adding it to the interpolated rate of change multiplied by the current coefficient of friction (determined as previously from the probe deflection vector direction and the measured surface normal direction).

We have found that by including this allowance for the angle of friction, the radial measuring errors can be reduced to sub-micron level.

What is claimed is:

1. A method of calibrating an analogue probe having a stylus with a workpiece-contacting tip of radius (r) comprising the steps of:
    a) mounting the probe and a calibration sphere of known radius (R) on a machine,
    b) causing relative movement between the probe and the sphere from a plurality of directions each of which is nominally normal to the surface of the sphere to bring the stylus tip into contact with said surface and deflect the stylus by a predetermined amount,
    c) reversing the relative movement and recording simultaneous values of the radial deflections of the stylus and of machine axis X,Y and Z positions at intervals at least until the stylus tip leaves the surface,
    d) extrapolating each of the recorded sets of readings to obtain values of the machine X,Y and Z axis positions when the stylus radial deflection is zero,
    e) calculating from the extrapolated machine axis positions the value (R+r) and the position of the centre of the sphere,
    f) at a pre-selected radial deflection of the stylus which is the same for each of the directions noting the a,b and c outputs of the probe, and, using a trial probe transformation matrix converting the probe a,b and c values into incremental X,Y and Z values of machine axis positions,
    g) using the calculated position of the centre of the sphere, determining the radius of the sphere (R+r) as measured in each of the directions,
    h) noting the differences in the radius measurements in each of the directions compared to the radius as determined in step (e) and,
    i) optimising the probe transformation matrix to minimise the differences in the calculated radius values.

2. A method of calibrating an analogue probe having a stylus with a workpiece-contacting tip of radius (r) comprising the steps of:
    a) mounting the probe and a calibration sphere of known radius (R) on a machine,
    b) causing relative movement between the probe and the sphere from a plurality of directions each of which is nominally normal to the surface of the sphere to bring the stylus tip into contact with said surface and deflect the stylus by a predetermined amount,
    c) reversing the relative movement and recording simultaneous values of the radial deflections of the stylus and of machine axis X,Y and Z positions at intervals at least until the stylus tip leaves the surface,
    d) interpolating each of the recorded sets of readings to obtain values of the machine X,Y and Z axis positions when the stylus radial deflection is close to zero,
    e) calculating from the interpolated machine axis positions the value (R+r) and the position of the centre of the sphere,
    f) at a pre-selected radial deflection of the stylus which is the same for each of the directions noting the a,b and c outputs of the probe, and, using a trial probe transformation matrix converting the probe a,b and c values into incremental X,Y and Z values of machine axis positions,
    g) using the calculated position of the centre of the sphere, determining the radius of the sphere (R+r) as measured in each of the directions,
    h) noting the differences in the radius measurements in each of the directions compared to the radius as determined in step (e) and,
    i) optimising the probe transformation matrix to minimise the differences in the calculated radius values.

3. A method of error mapping an analogue probe having a stylus comprising the steps of:
    calibrating the probe by:
        (a) mounting the probe and a calibration artifact having at least one known dimension on a machine having a plurality of axes of movement, (b) at a plurality of locations around the artifact, bringing the probe into a position where its stylus is in contact with a surface of the artifact, (c) for each said location around the artifact, determining values of the machine axis positions when the stylus deflection is at or close to zero, and calculating from said machine axis positions a value related to a said known dimension of the artifact, (d) for each said location around the artifact and at a pre-selected deflection of the stylus, noting the outputs of the probe, using a trial probe transformation matrix to convert the probe outputs into values of machine axis positions and determining therefrom a value related to a said known dimension of the artifact, (e) noting the differences in the values related to the known dimension as determined in step (d), compared to the values thereof as calculated in step (c) and, (f) optimizing the probe transformation matrix to minimize the differences noted in step (e), using the probe transformation matrix generated by the calibration step, transforming probe output data at least at two different deflections of the stylus for one contact point on the artifact into machine axis positions, calculating a value related to a said known dimension of the artifact for each deflection magnitude, repeating the calculation for at least two deflections at other locations around the artifact, comparing the calculated values related to said known dimension with the previously calibrated value and noting the errors in each case, storing the errors against the respective values of deflection to form the error map.

4. A method of error mapping an analogue probe as claimed in claim 3 and comprising the further steps of:

determining the angle of friction between the probe stylus and the artifact, correlating the variation in the error values with the variation in friction angle, and storing this variation as an additional term in the error map.

5. A method of calibrating an analogue probe having a deflectable workpiece-contacting stylus, comprising the steps of:

(a) mounting the probe and a calibration artifact having at least one known dimension on a machine having a plurality of axes of movement, (b) at a plurality of locations around the artifact, bringing the probe into a position where its stylus is in contact with a surface of the artifact, (c) for each said location around the artifact, determining values of the machine axis positions when the stylus deflection is at or close to zero, and calculating from said machine axis positions a value related to a said known dimension of the artifact, (d) for each said location around the artifact and at a pre-selected deflection of the stylus, noting the outputs of the probe, using a trial probe transformation matrix to convert the probe outputs into values of machine axis positions, and determining therefrom a value related to a said known dimension of the artifact, (e) noting the differences in the values related to the known dimension as determined in step (d), compared to the values thereof as calculated in step (c) and, (f) optimizing the probe transformation matrix to minimize the differences noted in step (e).

6. A method of calibrating an analogue probe as claimed in claim 5, wherein the artifact is a sphere and said known dimension is the radius of the sphere.

7. A method of calibrating an analogue probe as claimed in claim 6, wherein the stylus has a tip having a radius, and said value related to a said known dimension is the sum of the radius of the sphere and the radius of the stylus tip.

8. A method of calibrating analogue probe as claimed in claim 5, wherein said values of the machine axis positions when the stylus deflection is at or close to zero are determined by causing relative movement between the probe and the artifact from a plurality of directions each of which is nominally normal to the surface of the artifact to bring the stylus into contact with said surface and deflect the stylus by a predetermined amount, recording simultaneous values of the deflections of the stylus and of machine axis X, Y and Z positions at intervals, and extrapolating or interpolating each of the recorded sets of readings to obtain values of the machine X, Y and Z axis positions when the stylus deflection is at or close to zero.

9. A method of calibrating an analogue probe as claimed in claim 8, wherein said simultaneous values of the deflections of the stylus and of machine axis X, Y and Z positions are recorded while reversing the relative movement.

10. A method calibrating an analogue probe as claimed in claim 6, wherein said values of the machine axis positions when the stylus deflection is at or close to zero are determined by causing relative movement between the probe and the sphere from a plurality of directions each of which is nominally normal to the surface of the sphere to bring the stylus into contact with said surface and deflect the stylus by a predetermined amount, recording simultaneous values of the radial deflections of the stylus and of machine axis X, Y and Z positions at intervals, and extrapolating or interpolating each of the recorded sets of readings to obtain values of the machine X, Y and Z axis positions when the stylus radial deflection is at or close to zero.

11. A method of calibrating an analogue probe as claimed in claim 10, wherein said simultaneous values of the deflections of the stylus and of machine axis X, Y and Z positions are recorded while reversing the relative movement.

12. A method of calibrating an analogue probe as claimed in claim 5, wherein the step (d) the pre-selected stylus deflection is the same for each location around the artifact.

13. A method of calibrating an analogue probe as claimed in claim 6, wherein in step (d) the pre-selected stylus deflection is radial and is the same for each location around the artifact.

14. A method of error mapping an analogue probe as claimed in claim 3, wherein the artifact is a sphere and said known dimension is the radius of the sphere.

15. A method of error mapping an analogue probe as claimed in claim 14, wherein the stylus has a tip having a radius; said value related to a said known dimension is the sum of the radius of the sphere and the radius of the stylus tip; said deflections of the stylus are radial deflections; and said errors are radial errors and are stored against the respective values of deflection and of the azimuth and elevation of the contact point to form the error map.

* * * * *